April 30, 1963   J. R. SMIRRA   3,087,643
PIERCEABLE DIAPHRAGM AND CUTTER FLUID CONTROL ARRANGEMENT
Filed June 13, 1960   3 Sheets-Sheet 1

*INVENTOR.*
JOHANNES R. SMIRRA
BY *Gerald Singer*
AGENT
*Albert Rosen*
ATTORNEY.

INVENTOR.
JOHANNES R. SMIRRA

United States Patent Office 3,087,643
Patented Apr. 30, 1963

3,087,643
PIERCEABLE DIAPHRAGM AND CUTTER FLUID
CONTROL ARRANGEMENT
Johannes R. Smirra, Los Angeles, Calif., assignor to Space Technology Laboratories, Inc., Los Angeles, Calif., a corporation of Delaware
Filed June 13, 1960, Ser. No. 35,473
13 Claims. (Cl. 220—47)

This invention relates generally to the art of controlling the flow of fluids, and in particular to positive sealing, single shot valves. While not limited thereto, the arrangement of the invention will be discussed in connection with a positive sealing diaphragm-type valve adapted to be pierced on command by a movable cutting tool.

In systems requiring the storage of highly volatile fluids it is often required that the valve assembly positively seal the fluid source from the system discharge. It is further required that the valve assembly be accurately and positively controlled in order to open a valve on command irrespective of existing pressure differentials. Probably the most important requirement is that the fluid flowing past the valve assembly have a reproducible flow pattern with a predetermined cross section.

Heretofore existing valves having adequate sealing characteristics have not proveded adequate control over fluid flow, whereas valves having adequate control over fluid flow have not exhibited adequate sealing characteristics. Those valves having the desired sealing characteristics are of the diaphragm type. Present day diaphragm type valves have not proven completely satisfactory in that the piercing or cutting of the diaphragm has not been controllable as to time of cutting or as to the manner in which the piercing or cutting has taken place. In considering piercing type diaphragm valves it was discovered that after the diaphragm was pierced resulting loose and torn particles of the diaphragm assumed various shapes which affected and changed the fluid flow pattern in nonreproducible and arbitrary ways. In addition, the torn particles contaminated the fluid and affected the utilizing device associated with the system. A consideration of burst-membrane diaphragm valves (where rupture of the diaphragm is effected by pressure differential) has shown that the diaphragm does not always rupture at the desired pressure differential. The latter is due in part to diaphragm structural nonuniformities. Other type valves, such as gate and butterfly valves, have been used; however, while these valves have adequate fluid flow control they have unsatisfactory sealing characteristics. These valves do not provide reliable closure without leakage over a relatively long period of time. Considering situations where highly corrosive liquids, where cryogenic liquids or where gases are to be stored, it can be appreciated that leakage of any kind can not be tolerated. Thus, it has been found that the prior art does not disclose a valve capable of satisfying the desired sealing conditions.

In considering the defects of the present day valves it was discovered that in order to produce a flow pattern having a predetermined cross section it was necessary to pierce and cut the diaphragm in such a manner that the cut diaphragm would open to a predetermined area that would remain fixed during the operating life of the valve. It is this concept and its achievement that represents the inventive concept of this invention. For example, in one embodiment (described in connection with the drawing) a valve is provided that has a substantially circular preformed diaphragm in the path of fluid flow. The diaphragm has a plurality of surface deformations or scorings defining a series of chords with each scoring terminating adjacent to another scoring. A movable cutting tool is positioned in piercing and cutting relationship with respect to the diaphragm, and is arranged to operate on command by a suitable pyrotechnic or high pressure fluid control. The cutting tool is arranged to cut the diaphragm up to the junction of the individual scorings, thereby allowing the resulting spent diaphragm to fold back in the direction of fluid movement, using the scorings as a hinge.

In the accompanying three sheets of drawing, wherein like reference characters refer to like or corresponding parts:

Figure 1:
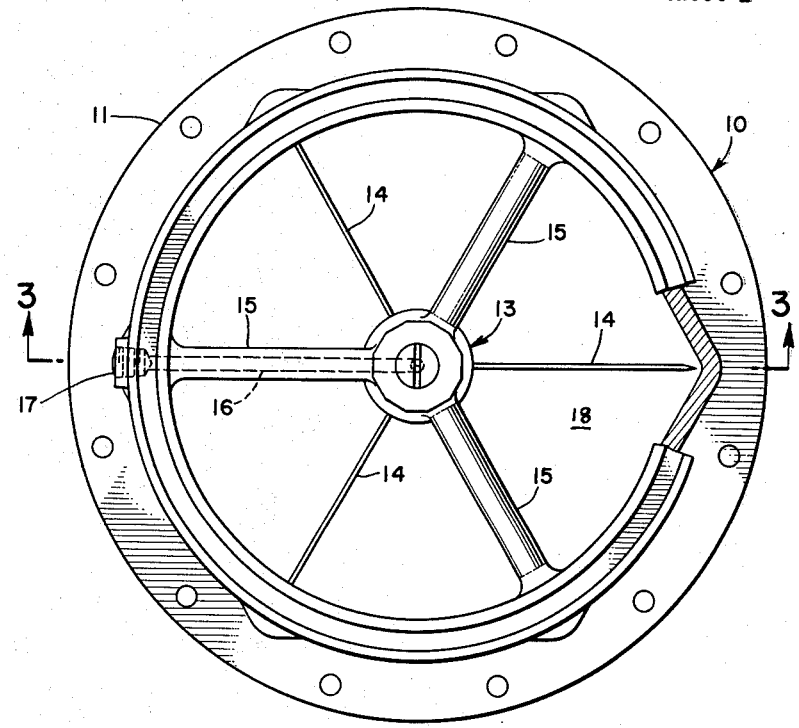
FIG. 1 is a top view of an embodiment of a diaphragm-type valve constructed according to the teachings of this invention and in which the view looks down in the normal direction of fluid flow.
Figure 2:
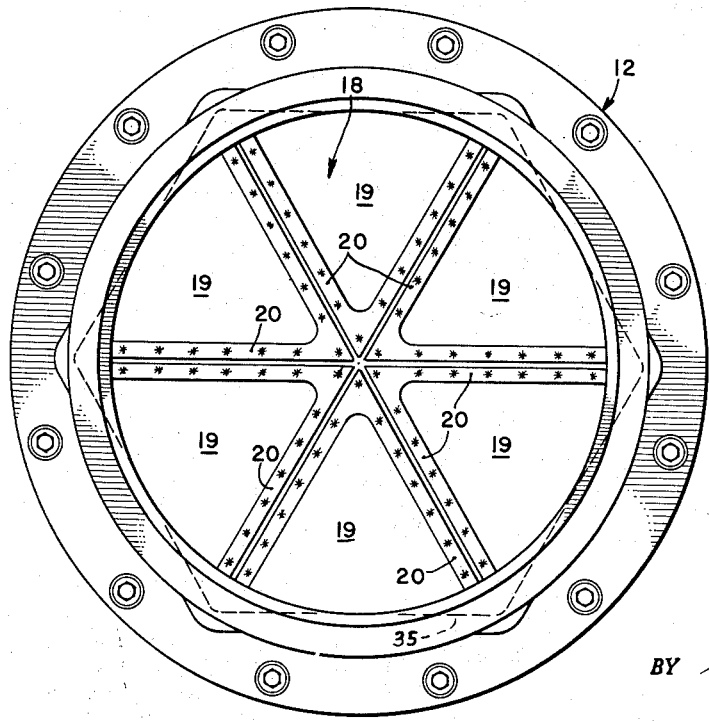
FIG. 2 is a bottom view of the diaphragm type valve illustrated in FIG. 1.

As will be described in connection with FIGS. 1 through 6, the embodiment in the form of a positive sealing, one-shot valve has a substantially circular preformed diaphragm 18 (FIG. 2). This diaphragm 18, located in the path of fluid flow, has a plurality of scorings 35 that join to collectively define a hexagonal array of chords. A movable cutting tool, in the form of six knife blades 14 (FIGS. 1 and 3), is positioned in piercing and cutting relationship with respect to the diaphragm 18, and is arranged to operate on command by any of the conventional pyrotechnic or high pressure fluid control arrangements (not shown). The cutting tool is arranged to cut the diaphragm up to the junction of the individual scorings 35, thereby allowing the resulting spent diaphragm, the individual flaps 19 (FIG. 3) of the cut diaphragm, to fold back in the direction of fluid movement using the scorings as a hinge.

Referring now to FIG. 1 there is shown a valve assembly comprising an upper housing 10, substantially circular in form, and having a flange 11 containing a series of holes adapted to allow the upper housing 10 to be bolted to a lower housing 12 (FIG. 2). The valve actually constructed and tested was originally conceived for use with a fluid being supplied from a circular pipe source and hence the adapting flange portion of the upper housing 10 is circular in form. The exact shape of the valve need only be dictated by the fluid source and the fluid discharge, since the basic principle of operation to be taught can be used with any configuration. Located centrally within the upper housing 10 is an actuating cylinder 13 arranged to hold and support the cutting tool, the plurality of blades 14. A blade actuating cylinder 13 is supported by means of radial arms 15. The arms 15, in turn, are flared in the direction of fluid flow so as to present a minimum of frontal area and also permit a laminar flow of fluid. In the present embodiment six equally spaced blades 14 were used. However, three of the blades are located directly behind the arms 15 and are not easily illustrated in FIG. 1. Located within one of the arm 15 is a passageway 16 arranged to provide communication from an external pressure source near the periphery of the upper housing 10, illustrated by reference 17, to the interior of the actuation cylinder 13.

Referring now to FIG. 2 there is shown a bottom view of the valve assembly illustrating the lower housing 12 and the bottommost portion of reinforced diaphragm 18. Diaphragm 18 has a circular periphery as determined by the geometry of the upper and lower housings 10 and 12 and is located intermediate said housings for effectively sealing the area above the upper housing 10 from the area below the lower housing 12. The central area of the diaphragm 18 is basically hemispherical in shape (FIG. 5) and is arranged with a plurality of scored lines or marks 35 which define a series of chords. The scored lines 35 are made in such a manner as to allow the portions to be cut or flaps 19 on the diaphragm 18 to open and fold in the direction of fluid travel (indicated by the arrow in FIG. 3). By scoring the diaphragm 18 along the defined chord lines it is possible to thereby predict in advance how the cut diaphragm will open (whereas the blades determine where the diaphragm will open). In designing the illustrated diaphragm 18 the polygonal central area defined by the chords was made equal to the area of the circular pipe feeding the upper open housing 10. This is to minimize any turbulence that may occur as the fluid passes through the valve assembly area. Thus the total diaphragm area is larger than either the feed or discharge area. It has been discovered that the key towards obtaining a uniform fluid flow and a predetermined cross section valve opening is to have the flaps 19 of the diaphragm 18 open and fold back along the scored marks 35, thereby presenting a predictable area for the fluid to flow through. Since the total diaphragm area is larger than the actual feed area or the actual discharge area, there is a first transition in size from the input area to the valve area supporting the diaphragm and a second transition back to the discharge area. The diaphragm 18 illustrated is a polygon of six sides and therefore has six scored marks to conform with the six blades 14 illustrated in FIG. 1. Since the illustrated embodiment uses six blades, the transition between the input area and the discharge area consists of six sides of which only sides 18a, 18b, and 18c are illustrated. The actual number of sides will be determined by the number of blades and the resultant defined polygon. All of the defined sides are part of the flow area and provide substantial support for the diaphragm in the region of the scorings. The outside diameter of the defined structure is therefore variable in order to maintain the input and discharge area equal to the polygon area of the diaphragm. The transition sides, as illustrated by 18a, 18b and 18c, provide a substantially flat supporting surface for each of the cut segments to fold against, thereby insuring that the defined polygon area will open without tearing. The piercing of the diaphragm by the cutting blades occurs initially at the central portion of the diaphragm 18 and the cutting extends from the central portion along and up to the junction of the scoring located near the periphery of the diaphragm. These cuts will reduce the diaphragm 18 to a series of six substantially identical flaps 19 each reinforced by a V-shaped member 20. The support members 20 serve a dual purpose of providing rigidity to each flap 19, thereby allowing each flap to fold back in the form of a flat member that does not affect the flow of fluid passing through the valve, and also preventing ripping or tearing of portions of the diaphragm during the cutting operation. Movement of the flaps during the fluid flow is undesirable since any movement would tend to vary the valve opening at a changing and unpredictable rate. Reinforcing the flaps has also been accomplished by using a plurality of stacked foil diaphragms 18 (FIG. 5) in which each diaphragm acts to support the others. Single diaphragms 18 of sufficient thickness, without external support, have been successfully tested and used. The preferred configuration, however, is to use a plurality of stacked diaphragms and wherein only the lowermost diaphragm 18 is reinforced. Reinforcing of the diaphragm 18 may be accomplished by means of spot welding, as illustrated in FIG. 2, and also by other means such as by gluing or ribbing.

Figure 3:
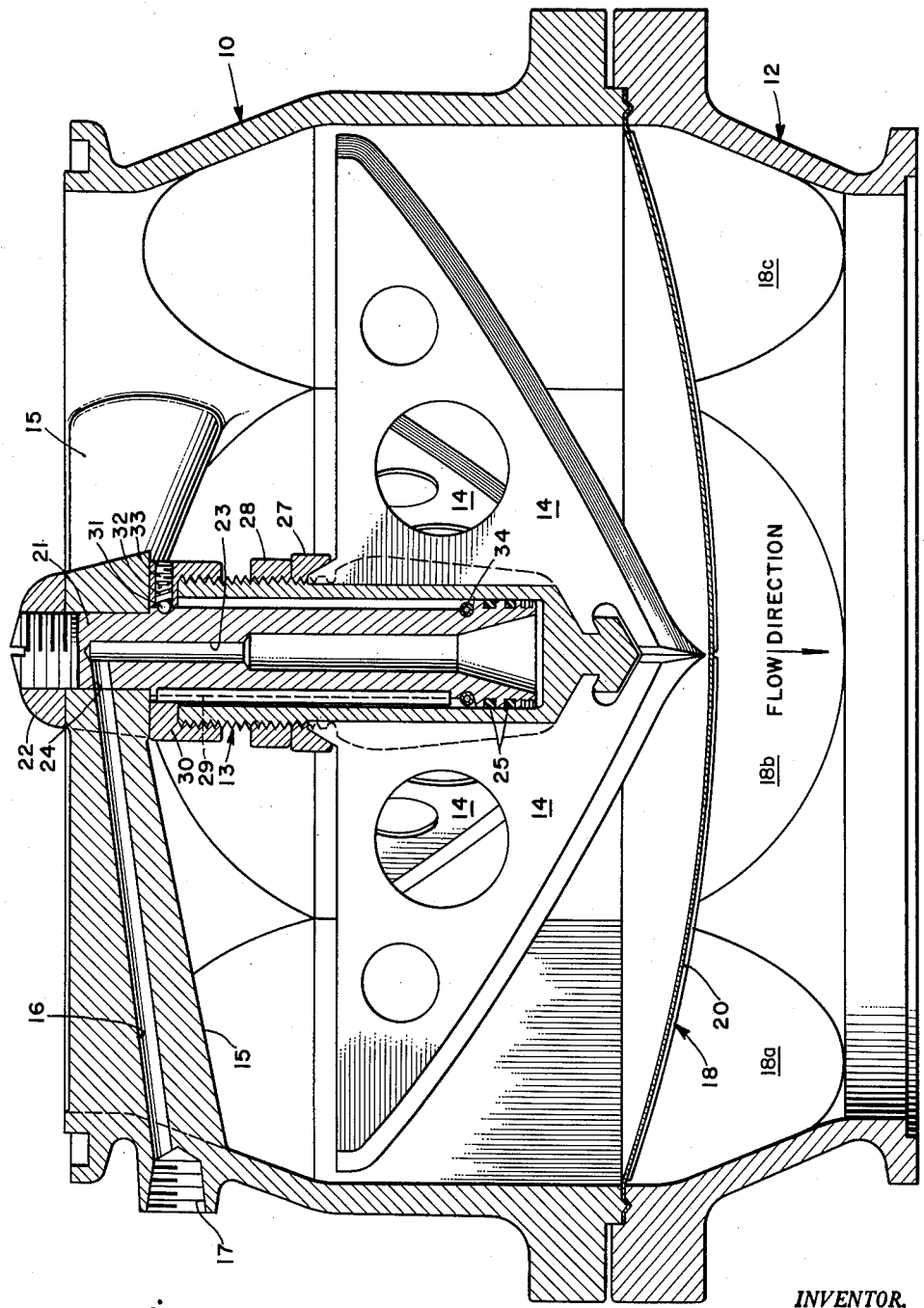
FIG. 3 is a sectional view taken along line 3—3 of FIG. 1, and which illustrates the valve in the normal position prior to operation.

Referring now to FIG. 3, there is shown a cross section taken along line 3—3 of FIG. 1. FIG. 3 more fully illustrates the normal position of the knife blades 14 with respect to the diaphragm 18 prior to the valve being operated. As mentioned previously, the particular embodiment disclosed herein was conceived to operate from a circular source and to operate into a circular discharge. Upon review it was discovered that by utilizing a hexagonal form it was possible to obtain a maximum valve cross sectional area for a minimum valve weight. In the embodiment disclosed in FIG. 3 the three support members 15 define a centrally located opening that is arranged to accept a stationary piston 21 that is locked in position by means of a lock nut 22. The stationary piston 21 has a central opening 23 of varying cross section that is largest at the open end and smallest at the opposite, closed end. That portion of the piston 21 near the closed end contains a lateral passageway 24 connecting the periphery of the piston 21 with the opening 23 in the piston. During assembly, the lateral passageway 24 is arranged to communicate with the passageway 16 located in one of the supporting arms 15. Located near the open end of stationary piston 21 and encircling the periphery thereof is a plurality of retaining rings 25 of the type used to correct for manufacturing error and to provide a seal for the fluid being controlled. The type of seal actually used, if one is necessary, will depend on the particular fluid being contained; for example, it is known that certain cryogenic materials require metal to metal seals. The actuation cylinder 13 is arranged to fit over the stationary piston 21 and arranged to move coaxially with the piston 21. The actuation cylinder 13 also serves the purpose of holding and supporting the six knife blades 14. This support of the knife blades 14 is realized by means of a retainer ring 27 that holds one edge of each of the cutting blades in the cutting position. A lock nut 28 holds the retaining ring 27 in this position. The actuation cylinder 13 assembly is moved in a given direction (the direction to effect cutting) by means of a key 29 that defines the relationship between the stationary piston 21 and the actuation cylinder 13. In other words, the placement and adjustment of the stationary piston 21, as determined by the lock nut 22, will determine the location of the actuation cylinder 13 within the upper and lower housings 10 and 12. The upper end of the actuation cylinder 13 contains a cap nut 30 having a lateral passageway for accepting a steel ball 31, spring 32, and set screw 33. A suitable notch is located on the periphery of the stationary piston 21 for accepting the steel ball 31. The steel ball and notch together provide detent action for maintaining the complete actuator cylinder 13 and accompanying assembly in a given position prior to operation.

In operation, a pressure generated by a suitable pressure means, as for example a pyrotechnic, hydraulic, or pneumatic source (not shown), is directed into the pressure source opening 17 on the upper housing 10. By means of the two passageways 16 and 24 the expanding pressure is directed to the central opening 23 located within the stationary piston 21. Since the piston 21 is open at only one end it will be apparent that the actuation cylinder 13 and associated assembly will now move. Pneumatic pressures of the order of 3000 pounds per square inch have been used for testing the valve assembly. Located at that point on the stationary piston 21 which corresponds to the end of travel of the actuation cylinder 13 is a circular ring 34. This ring 34 is arranged to limit the travel of the cylinder 13 and absorb the moving force and inertia of this cylinder.

Figure 4:
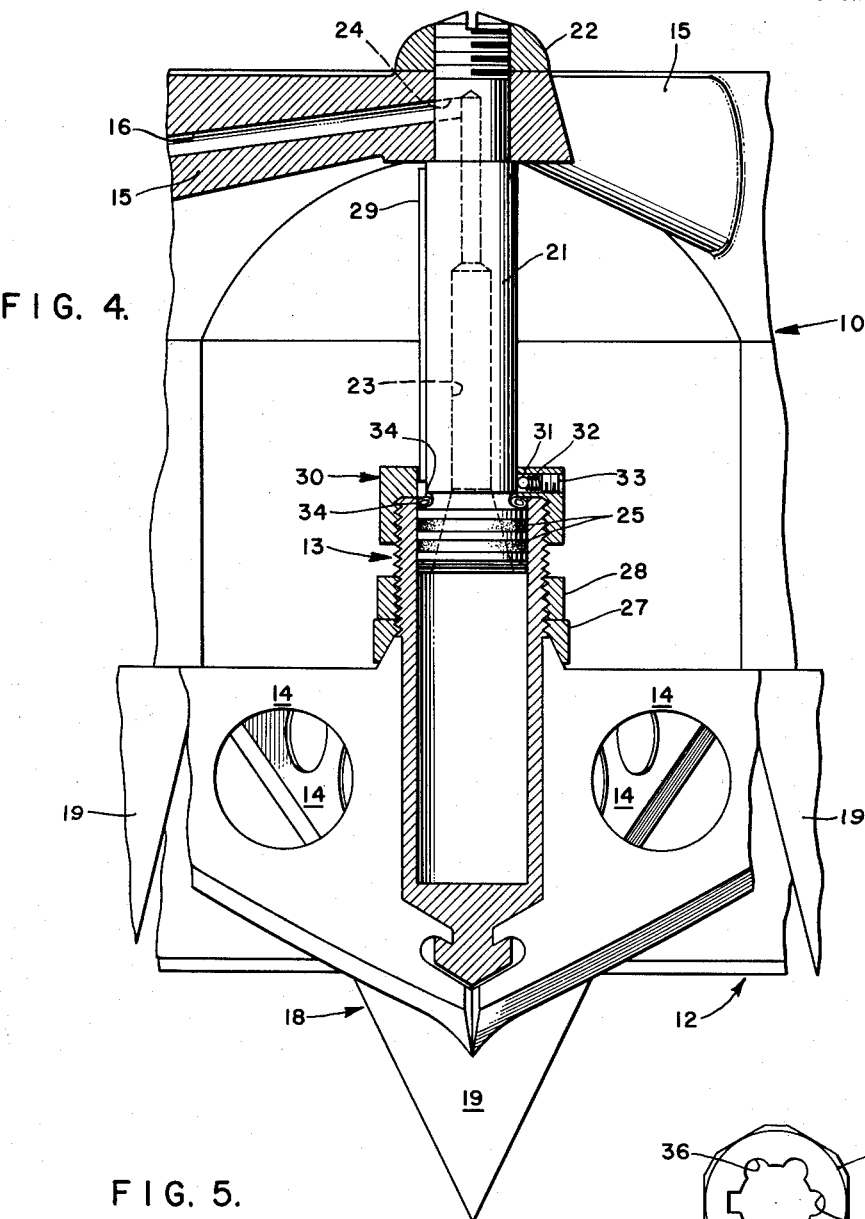
FIG. 4 is a partial sectional view similar to that shown in FIG. 3 illustrating the valve in the operated position.

Referring now to FIG. 4, there is shown a cross sectional view similar to that illustrated in FIG. 3, with the exception that the actuation cylinder 13 is illustrated in the fully extended or actuated position. The operation of the circular ring 34 is now more apparent in that the end portion of the cap nut 30 has now contacted the ring 34 causing it to be deformed, and in the process effectively dissipating the potential energy contained in the moving mass of the actuation cylinder 13. FIG. 4 also illustrates the opened position of one of the flaps 19 of the diaphragm 18 after the diaphragm has been pierced and cut and the fluid has commenced passage therethrough. Since the action of each blade 14 is to gradually cut along successive portions of its line of cut, instead of ramming through the diaphragm simultaneously along all portions of the line of cut, tearing and ripping tendencies are avoided.

Figure 5:
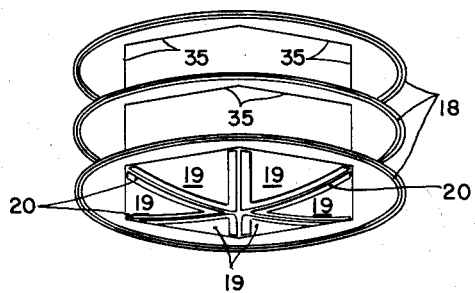
FIG. 5 is an exploded view illustrating a plurality of stacked foil diaphragms.

Referring now to FIG. 5 there is shown a plurality of stacked preformed diaphragms 18 used in an effort to minimize the tearing effect that may be caused by manufacturing striations or marks or other surface irregularities (such as caused by preferential grain orientation during rolling of sheet metal stock). This effect is minimized by orienting the stacked diaphragms 18 such that the surface marks are angularly oriented with respect to each other. When using the stacked array it is only necessary for the outermost diaphragm to be reinforced and for only one diaphragm to effect the seal. The stacked array also minimizes the need for the outermost diaphragm to be reinforced. The stacked diaphragms 18 more fully illustrate how the scored markings, identified by reference number 35, are formed by having preformed diaphragms and how the scored marks define a series of chords near the periphery of each of the diaphragms. The scored markings define a central polygonal form having a number of sides determined only by the number of blades used. The central area bounded by the scorings will be the actual area of the opened valve after it is operated. Each flap 19, formed after the diaphragm is cut, will fold back along a scored mark. Each scoring, therefore, acts as a hinge for the associated flap as determined by the geometry of the diaphragm. The actual shape of the diaphragm or number or shape of the blades will be dictated only by outside design considerations.

Figure 6:
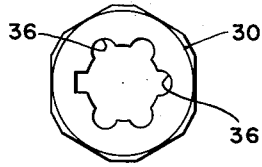
FIG. 6 is a top view of a captive nut illustrated in FIG. 4.

Referring now to FIG. 6 there is shown a top view of the captive nut 30 illustrating a plurality of openings 36. These openings have a tendency to act as a dash pot and thereby substantially control the speed of operation of the actuated cylinder 13 after it is impulsed. This dash pot effect tends to maintain a constant speed for the actuated piston 13 after its operation has been initiated.

While one embodiment of the invention has been disclosed and illustrated herein, it will be appreciated that many modifications may be made. It will be realized, of course, that the number of scoring marks used on the diaphragms will be related to the number of blades used. The preformed diaphragm in every case cooperates with the type of cut made by the blades so as to produce a spent diaphragm arrangement that has substantially no effect on the fluid flow through the valve.

What is claimed is:

1. A fluid control arrangement comprising: walls defining a passageway for a fluid; a preformed diaphragm having a peripheral portion and located in sealing relationship with said passageway for preventing the fluid from moving; said preformed diaphragm being scored in locations adjacent portions of the diaphragm subjected to cutting, thereby contributing to the folding of cut portions of said diaphragm; a movable cutting tool mounted for piercing and cutting said diaphragm along regions extending in directions to intersect said scoring whereby the cut portions of said diaphragm are folded back along said scoring in the direction of fluid movement without tearing and remain attached to the diaphragm; and means for moving said cutting tool into said diaphragm whereby to pierce and cut said diaphragm.

2. The arrangement claimed in claim 1 wherein said cutting tool comprises a plurality of blades and each of said blades is arranged to pierce and cut said diaphragm up to said scorings.

3. The arrangement claimed in claim 1 wherein said diaphragm comprises a plurality of metallic membranes each having a predetermined grain orientation different from that of the other membranes.

4. In a diaphragm type valve the improvement comprising: a preformed diaphragm having at least one scored mark, said scored mark defining a chord on said diaphragm, and a cutting tool mounted for piercing and cutting said diaphragm to intersect two spaced apart portions of said scored mark, said cut portion of said diaphragm folding back along said scored mark as a hinge without tearing and in the direction of fluid flow.

5. In a diaphragm type valve, having a predetermined direction of fluid flow, the improvement comprising: a preformed diaphragm having a plurality of scorings collectively defining a polygon, and a cutting tool mounted for substantially linear travel for piercing and cutting said diaphragm substantially to intersect said scorings, each of said cut portions of said diaphragm folding back along a single scoring as a hinge without tearing and in the direction of fluid flow.

6. A positive sealing valve comprising a walled area defining a passageway for a fluid, at least one diaphragm located in said passageway for preventing the fluid from moving through said passageway, said diaphragm having at least one scored mark, a portion of said walled area providing substantial support for said diaphragm in the region of said scored mark a movable cutting tool for piercing and cutting said diaphragm, said cutting tool being mounted for movement to cut said diaphragm substantially to intersect two spaced apart portions of said scored mark whereby the cut portion of said diaphragm is adapted to fold back along said scored mark without tearing and in the direction of fluid movement, and means for moving said cutting tool into piercing and cutting relation with respect to said diaphragm thereby enabling said fluid to move through said passageway.

7. A positive sealing valve comprising a walled area defining a passageway for a fluid, a plurality of stacked diaphragms located in said passageway for preventing the fluid from moving therethrough, each of said diaphragms having a plurality of scorings collectively defining a polygon, a portion of said walled area providing substantial support for said diaphragm in the region of said scored mark each of said diaphragms having direction oriented irregularities and being arranged so that the direction of the irregularities of each diaphragm is angular with respect to the others, a movable cutting tool mounted for piercing and cutting said diaphragms substantially to intersect said scorings whereby cut portions of said diaphragms fold back along said scored mark without tearing and in the direction of fluid movement, and means for moving said cutting tool into said diaphragms whereby said diaphragms are pierced and said fluid is free to move.

8. A positive sealing valve comprising a walled area defining a passageway for a fluid, a plurality of stacked diaphragms located in said passageway for preventing the fluid from moving therethrough, each of said diaphragms having a plurality of scorings collectively defining a polygon, a portion of said walled area providing substantial support for said diaphragm in the region of said scored mark a movable cutting tool having a plurality of cutting blades symmetrically arranged with respect to a center line of said diaphragms for piercing and cutting said diaphragms substantially to intersect said scorings whereby the cut portions of said diaphragms fold back along said scorings without tearing and in the direction of fluid movement, at least one of said diaphragms being reinforced along said cut portions whereby said cut portions remain straight and resist any tendency to curl during fluid movement, and means for moving said cutting tool into said diaphragms at a substantially constant speed whereby said diaphragms are pierced and said fluid is free to move.

9. A preformed diaphragm comprising a plurality of scorings collectively defining a polygon, the central area defined by said polygon being formed hemispherical in shape, said diaphragm adapted to be cut radially into a plurality of V-shaped segments for folding about said scorings, said diaphragm being reinforced along each edge portion of said V-shaped segments.

10. In combination, a plurality of preformed circular diaphragms, each having a plurality of similar scorings collectively defining a polygon, the central area of each diaphragm defined by said polygon being formed hemispherical in shape, each of said diaphragms having a predetermined grain orientation different from each other and nesting one within the other, said diaphragms adapted to be cut radially into a plurality of V-shaped segments for folding about said scorings, the outside portion of the bottommost diaphragm in said nesting relationship being reinforced along each edge portion of said V-shaped segments.

11. A pierced diaphragm valve comprising walls defining a passageway for a fluid,
a diaphragm mounted in said passageway and having a plurality of scorings collectively defining a polygon, the central area defined by said polygon being formed hemispherical in shape, said diaphragm adapted to be cut radially into a plurality of V-shaped segments for folding about said scorings, said diaphragm being reinforced along each edge portion of said V-shaped segments, and
a cutting tool located within said passageway for cutting and piercing said diaphragm up to said scorings thereby allowing said V-shaped segments to fold about said scorings like a hinge.

12. A pierced diaphragm valve comprising walls defining a passageway for a fluid,
a plurality of preformed circular diaphragms, each having a plurality of similar scorings collectively defining a polygon, the central area of each diaphragm defined by said polygon being formed hemispherical in shape, each of said diaphragms having a predetermined grain orientation different from each other and nesting one within the other, said diaphragms adapted to be cut radially into a plurality of V-shaped segments for folding about said scorings, the outside portion of the bottom-most diaphragm in said nesting relationship being reinforced along each edge portion of said V-shaped segments, and
a cutting tool located within said passageway for cutting and piercing said diaphragm up to said scorings thereby allowing said V-shaped segments to fold about said scorings like a hinge.

13. A pierced diaphragm valve comprising walls defining a passageway for a fluid,
a diaphragm mounted in said passageway and having a plurality of scorings collectively defining a polygon, the central area defined by said polygon being formed hemispherical in shape, said diaphragm adapted to be cut radially into a plurality of V-shaped segments for folding about said scorings, said diaphragm being reinforced along each edge portion of said V-shaped segments, and
a cutting tool located within said passageway for cutting and piercing said diaphragm up to said scorings thereby allowing said V-shaped segments to fold about said scorings like a hinge, said cross sectional area of said passageway being substantially equal to the area of said polygon thereby reducing the pressure drop across the opened diaphragm.

References Cited in the file of this patent

UNITED STATES PATENTS

| | | |
|---|---|---|
| 2,586,858 | Parsons | Feb. 26, 1952 |
| 2,656,950 | Coffman | Oct. 27, 1953 |
| 2,889,070 | Coffman | June 2, 1959 |
| 2,933,333 | Bredtschneider | Apr. 19, 1960 |
| 2,958,545 | Stelzer | Nov. 1, 1960 |

FOREIGN PATENTS

| | | |
|---|---|---|
| 131,593 | Sweden | May 2, 1951 |
| 693,636 | Great Britain | July 1, 1953 |
| 774,812 | Great Britain | May 15, 1957 |